United States Patent

Senuma et al.

Patent Number: 5,143,960
Date of Patent: Sep. 1, 1992

[54] MODIFIED ETHYLENE COPOLYMER

[75] Inventors: Akitaka Senuma, Yokohama; Toshiyuki Nagai, Ayase; Kiroku Tsukada; Akio Hayashi, both of Yokohama, all of Japan

[73] Assignee: Nippon Unicar Company Limited, Danbury, Conn.

[21] Appl. No.: 406,287

[22] Filed: Sep. 12, 1989

[51] Int. Cl.$^5$ .................. C08F 255/02; C08F 261/02; C08F 222/40; B32B 27/28

[52] U.S. Cl. .................. 525/282; 525/263; 525/301; 525/308; 525/302; 525/285; 524/556; 524/557; 524/560; 524/562; 428/35.7; 428/68; 428/473.5; 428/523

[58] Field of Search ................ 526/262; 525/263, 282, 525/308, 301, 302

[56] References Cited

U.S. PATENT DOCUMENTS

| | | | |
|---|---|---|---|
| 3,352,832 | 11/1967 | Barr | 526/262 |
| 3,641,215 | 2/1972 | Usamoto et al. | 260/897 A |
| 3,676,404 | 7/1972 | Nield | 526/262 |
| 3,766,142 | 10/1973 | Nield et al. | 260/47 UA |
| 4,163,097 | 7/1979 | Baumann et al. | 526/262 |
| 4,205,151 | 5/1980 | Dale et al. | 526/262 |
| 4,294,949 | 10/1981 | Karrer | 526/262 |
| 4,612,346 | 9/1986 | Chiba et al. | 525/66 |
| 4,900,332 | 2/1990 | Denis et al. | 526/262 |

FOREIGN PATENT DOCUMENTS

| | | |
|---|---|---|
| 61-95011 | 5/1986 | Japan . |
| 63-122712 | 5/1988 | Japan . |
| 63-23056 | 9/1988 | Japan . |

*Primary Examiner*—James J. Seidleck
*Assistant Examiner*—Vasu S. Jagannathan
*Attorney, Agent, or Firm*—Saul R. Bresch

[57] ABSTRACT

A composition comprising (i) a copolymer of ethylene; one or more polar unsaturated alcohols, acids, or esters; and a N-substituted maleimide or (ii) a copolymer of ethylene and one or more polar unsaturated alcohols, acids, or esters grafted with an N-substituted maleimide.

9 Claims, No Drawings

MODIFIED ETHYLENE COPOLYMER

TECHNICAL FIELD

This invention relates to a copolymer of ethylene and a polar comonomer modified with an N-substituted maleimide.

BACKGROUND ART

Ethylene/polar comonomer copolymers such as copolymers of ethylene and vinyl acetate and ethylene and ethyl acrylate are in general use in various forms such as film and molded articles. The applications to which these copolymers can be put, however, are rather limited because of their relatively poor mechanical strength and heat resistance despite attempts to improve these properties by crosslinking the copolymers with organic peroxides.

DISCLOSURE OF THE INVENTION

An object of this invention, therefore, is to provide a copolymer of ethylene and a polar comonomer, which, in its applied form, has improved mechanical strength and heat resistance.

Other objects and advantages will become apparent hereinafter.

According to the present invention, the above object is met by a composition comprising (i) a copolymer of ethylene; one or more polar unsaturated alcohols, acids, or esters; and an N-substituted maleimide or (ii) a copolymer of ethylene and one or more polar unsaturated alcohols, acids, or esters grafted with an N-substituted maleimide.

DETAILED DESCRIPTION

The polar unsaturated alcohol, acid, or ester can be any one of a number of compounds having 2 to 20 carbon atoms. Examples are vinyl alcohol and other unsaturated alcohols such as vinyl phenol, 2 hydroxyethyl (meth)acrylate, 2 hydroxypropyl (meth)acrylate and polyethylene glycol (meth)acrylate; vinyl esters such as vinyl butyrate, vinyl pivalate, vinyl acetate and vinyl propionate; unsaturated carboxylic acid esters such as ethyl acrylate, ethyl methacrylate, butyl acrylate, butyl methacrylate, methyl methacrylate; unsaturated acids such as acrylic acid, methacrylic acid, maleic anhydride, maleic acid, fumaric acid, itaconic acid, citraconic anhydride and crotonic acid. Generally, one or two of these polar unsaturated compounds are included as comonomers. Additional comonomers such as alpha olefins having 2 to 12 carbon atoms can also be included in the copolymer. The term "copolymer" is considered to include two or more comonomers.

Examples of copolymers in which the N-substituted maleimide can be included as a comonomer or to which the N-substituted maleimide can be grafted are ethylene-vinyl acetate copolymer, ethylene-ethyl acrylate copolymer, ethylene-ethyl methacrylate copolymer, ethylene butyl acrylate copolymer, ethylene-butyl methacrylate copolymer, ethylene acrylic acid copolymer, ethylene-methacrylic acid copolymer, ethylene-vinyl alcohol copolymer, ethylene acrylic acid ethyl acrylate terpolymer, and ethylene-vinyl alcohol ethyl acrylate terpolymer.

Maleimide has the following structural formula:

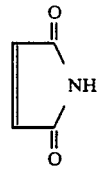

The N-substitution replaces the hydrogen attached to the nitrogen atom. Substituents can be aromatic or saturated aliphatic or cycloaliphatic radicals, which can themselves be substituted. The aromatic or saturated aliphatic radicals can be, for example, alkyl, cycloalkyl, alkaryl, or aralkyl preferably having 3 to 18 carbon atoms. The substituents with respect to the aromatic and saturated aliphatic or cycloaliphatic radicals can be halogen, hydroxy, alkoxy, amino and cyano.

Examples of N-substituted maleimides suitable for use in this invention are: N-phenylmaleimide, N-methylphenylmaleimide, N-chlorophenylmaleimide, N-cyclohexylmaleimide, N-butylmaleimide, N-isopropylmaleimide, N-laurylmaleimide, N-stearylmaleimide, N-methylmaleimide, N-phenylcitraconicmaleimide, N-phenyl-3, 4-dimethylmaleimide, N-(4-cyanophenyl)maleimide, N-(4-hydroxyphenyl)maleimide, N-(4-aminophenyl)maleimide, N-(4-methoxyphenyl)maleimide, and N-(4-benzamide)maleimide.

The grafted copolymer can be prepared by simultaneously mixing and heating the ethylene/polar unsaturated comonomer copolymer together with an N-substituted maleimide and an organic peroxide. For each 100 parts by weight of copolymer, about 0.01 to about 100 parts by weight of N-substituted maleimide, preferably about 0.1 to about 10 parts of maleimide, and about 0.01 to about 10 parts by weight of organic peroxide, preferably about 0.5 to about 3 parts of peroxide, can be used.

The organic peroxide used for grafting preferably has a decomposition temperature of 100° to 220° C. for a half life of 10 minutes and is exemplified by the following compounds (the numbers set off by the parentheses are their decomposition temperatures (° C.)): succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl 2,5 -di(benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5 dimethyl 2,5 di(t-butyl peroxy)hexane (155), t-butyl cumyl peroxide (155), t-butyl hydroperoxide (158), di-t-butyl peroxide (160), 2,5 -dimethyl-2,5 -di(t-butyl peroxy)hexane-3 (170), di-isopropyl benzene hydroperoxide (170), p-menthane hydroperoxide (180), and 2,5-dimethyl hexane-2,5 dihydroperoxide (213).

The organic peroxides or other conventional crosslinking agents can also be used to crosslink the copolymers or grafted copolymers, which are the subject of this invention.

The copolymer can be prepared by copolymerizing ethylene, the polar unsaturated comonomer, and an N-substituted maleimide in the presence of an ethylene polymerization catalyst, e.g., one that is titanium or vanadium based. See U.S. Pat. Nos. 4,302,566 and 4,508,842. The proportions of comonomers can be about as follows:

| Comonomer | Percent by Weight | |
|---|---|---|
| | Broad Range | Preferred Range |
| ethylene | 60 to 99 | 70 to 94 |
| polar unsaturated comonomer | 0.5 to 50 | 5 to 30 |
| N-substituted maleimide | 0.01 to 50 | 0.1 to 10 |

One technique for preparing the copolymer involves contacting the comonomers in the gas phase in a tubular or, preferably, a tank reactor under a pressure of about 500 to about 4000 kilograms per square centimeter, preferably about 1000 to about 4000 kilograms per square centimeter, at a temperature of about 100 to about 400° C., preferably about 150 to about 350° C., in the presence of a radical polymerization initiator and, if necessary, a chain transfer agent.

In the copolymerization, any one of the radical polymerization initiators and chain transfer agent conventionally used for the homopolymerization or copolymerization of ethylene can be used. Examples of the polymerization initiator are organic peroxides such as lauryl peroxide, dipropionyl peroxide, benzoyl peroxide, di-t-butyl peroxide, t-butyl hydroperoxide, and t-butyl peroxy-isobutyrate; molecular oxygen; and azo compounds such as azobisisobutyronitrile and azoisobutyrovaleronitrile. Examples of the chain transfer agent include paraffinic hydrocarbons such as methane, ethane, propane, butane, and pentane; α-olefins (such as propylene, butene-1, and hexene-1); aldehydes such as formaldehyde, acetaldehyde, and N-butylaldehyde; ketones such as acetone, methyl ethyl ketone, and cyclohexanone; aromatic hydrocarbons; and chlorinated hydrocarbons.

Both the grafted copolymer and the copolymer of ethylene, polar unsaturated comonomer, and N-substituted maleimide can be used to provide film, sheet, tubing, pipe, blow molded articles, injection molded articles, and insulation and jacketing for wire and cable, i.e., one or more layers surrounding an electrical conductor or core.

Additives which can be included in the grafting composition of copolymer, N-substituted maleimide, and organic peroxide or used together with the copolymer, which includes the N-substituted maleimide as a comonomer, are coupling agents, surfactants, reinforcing filler or polymer additives, antioxidants, ultraviolet stabilizers, antistatic agents, pigments, dyes, slip agents, plasticizers, lubricants, viscosity control agents, extender oils, metal deactivators, water tree growth retardants, voltage stabilizers, flame retardant additives, smoke suppressants, crosslinking agents, processing aids, and carbon black.

The invention is illustrated by the examples.

EXAMPLE 1

A composition is made by mixing 100 parts by weight of ethylene/vinyl acetate (EVA) copolymer having a melt index of 5 and containing 25 percent by weight vinyl acetate based on the weight of the copolymer; 3 parts by weight of N-phenylmaleimide; 0.3 part by weight of dicumyl peroxide; and 0.1 part by weight of an antioxidant, tetrakis [methylene(3,5 -di-tert-butyl 4-hydroxyhydrocinnamate)]methane, at 190° C. for 10 minutes using a Brabender mixer. The composition is converted into a 1 millimeter thick sheet by compression molding. The sheet has a compression strength and elongation at 23° C. and a Vicat softening point at a 100 gram load as set forth in Table I.

EXAMPLE 2

Example 1 is repeated except that N-phenylmaleimide is omitted. The physical properties of the sheet are set forth in Table I.

EXAMPLE 3

Example 1 is repeated except that dicumyl peroxide is omitted. The physical properties of the sheet are set forth in Table I.

EXAMPLE 4

Example 1 is repeated except that N-phenylmaleimide and dicumyl peroxide are omitted. The physical properties of the sheet are set forth in Table I.

EXAMPLE 5

Example 1 is repeated except that the EVA copolymer is replaced with a high pressure polyethylene having a melt index of 4.7 and a density of 0.918 gram per cubic centimeter. The physical properties of the sheet are set forth in Table I.

EXAMPLE 6

Example 5 is repeated except that N-phenylmaleimide is omitted. The physical properties of the sheet are set forth in Table I.

EXAMPLE 7

Example 5 is repeated except that the high pressure polyethylene is replaced with an ethylene/ 1-butene copolymer having a melt index of 4.8 and a density of 0.900 gram per cubic centimeter. The physical properties of the sheet are set forth in Table I.

EXAMPLE 8

Example 7 is repeated except that N-phenylmaleimide is omitted. The physical properties of the sheet are set forth in Table I.

TABLE I

| Example | tensile strength (kilograms per square centimeter) | elongation (percent) | Vicat softening point (°C.) |
|---|---|---|---|
| 1 | 310 | 700 | 61 |
| 2 | 120 | 500 | 57 |
| 3 | 115 | 850 | 54 |
| 4 | 110 | 860 | 54 |
| 5 | 140 | 550 | — |
| 6 | 130 | 280 | — |
| 7 | 180 | 780 | — |
| 8 | 150 | 950 | — |

EXAMPLE 9

Example 1 is repeated except that the EVA copolymer is replaced with an ethylene/ethyl acrylate (EEA) copolymer having a melt index of 6 and containing 20 percent by weight ethyl acrylate based on the weight of the copolymer, and the N-phenylmaleimide is replaced with N-cyclohexylmaleimide. The physical properties of the sheet are set forth in Table II.

EXAMPLE 10

Example 9 is repeated except that N-cyclohexylmaleimide is omitted. The physical properties of the sheet are set forth in Table II.

EXAMPLE 11

Example 9 is repeated except that the dicumyl peroxide is omitted. The physical properties of the sheet are set forth in Table II.

EXAMPLE 12

Example 9 is repeated except that the dicumyl peroxide and N-cyclohexylmaleimide are omitted. The physical properties of the sheet are set forth in Table II.

TABLE II

| Example | tensile strength (kilograms per square centimeter) | elongation (percent) | Vicat softening point (°C.) |
| --- | --- | --- | --- |
| 9 | 95 | 750 | 59 |
| 10 | 52 | 400 | 57 |
| 11 | 45 | 900 | 52 |
| 12 | 40 | 960 | 52 |

EXAMPLE 13

Example 1 is repeated except that the EVA copolymer is replaced with an ethylene/ethyl acrylate/acrylic acid terpolymer prepared by hydrolyzing an ethylene/ethyl acrylate copolymer having a melt index of 20 and containing 40 percent by weight ethyl acrylate. 70 percent by weight of the ethyl acrylate is hydrolyzed to acrylic acid.

The 3 parts of N-phenylmaleimide are replaced with 2 parts of N-isopropylmaleimide; the 0.3 part of dicumyl peroxide is replaced by 0.1 part of t-butyl peroxy isopropyl carbonate; and the temperature in the Brabender mixer is 150° C.

The physical properties of the sheet are set forth in Table III.

EXAMPLE 14

Example 13 is repeated except that the N-isopropylmaleimide is omitted. The physical properties of the sheet are set forth in Table III.

TABLE III

| Example | tensile strength (kilograms per square centimeter) | elongation (percent) |
| --- | --- | --- |
| 13 | 140 | 700 |
| 14 | 110 | 400 |

EXAMPLE 15

Example 1 is repeated except that the EVA copolymer has a melt index of 20 and contains 28 percent by weight vinyl acetate based on the weight of the copolymer; the composition is pelletized and the pellets are formed into a 70 micron thick tubular film using a 40 millimeter diameter screw extruder having a length to diameter ratio of 24 at an extrusion temperature of 170° C. and a blow ratio of 1.6. The film has a breaking strength of 280 kilograms per square centimeter.

EXAMPLE 16

Example 9 is repeated except that the EEA copolymer has a melt index of 20 and contains 28 percent by weight ethyl acrylate; the composition is pelletized and the pellets are formed into a tube having an outside diameter of 18 millimeters and a wall thickness of 2 millimeters using a 20 millimeter diameter extruder having a length to diameter ratio of 24 at an extrusion temperature of 170° C. The tube has a breaking strength of 89 kilograms per square centimeter.

EXAMPLE 17

Example 15 is repeated except that the composition is converted into a blow molded container (1.6 liters in volume and 50 grams in weight) using a 55 millimeter diameter extrusion blow molding machine having a length to diameter ratio of 23.5 at a molding temperature of 170° C. The container has good impact resistance, environmental stress cracking (ESC) resistance, and heat resistance.

Impact resistance is evaluated by dropping the container filled with brine at minus 5° C. The container breaks when dropped from a height of 10 meters. ESC resistance is measured according to ASTM D1693: $F_{50}$ is greater than 500 hours. Heat resistance is evaluated by heating the container at rest in a hot air oven. The container begins to deform at 110° C.

EXAMPLE 18

Example 17 is repeated except that the pellets are formed into a transport container using an injection molding machine (15 ounces, 150 ton, 45 millimeter diameter in-line screw type) under the following molding conditions: molding temperature: 150° C; plasticizing screw speed: 85 rpm; mold temperature: 40° C.; primary injection: 900 kilograms per square centimeter for 3 seconds; secondary injection: 700 kilograms per square centimeter for 4 seconds. The transport container has a minimum of warpage, and good flexibility, ESC resistance, creep, and mechanical strength.

EXAMPLE 19

Example 18 is repeated except that the pellets are used for wire coating. A 0.2 millimeter thick coating layer is extruded about a conductor 0.5 millimeter in diameter at an extrusion temperature of 180° C. and an extrusion rate of 500 meters per minute using a 50 millimeter diameter wire coating apparatus having a length to diameter ratio of 26. The coating has good surface smoothness, insulating properties, and heat resistance.

EXAMPLE 20

A copolymer of ethylene, vinyl acetate, and N-phenylmaleimide is prepared in a 300 cubic centimeter stirred autoclave in the presence of cumene hydroperoxide as a polymerization initiator. The polymerization temperature is 210° C. and the pressure is 1500 kilograms per square centimeter. The feed rates are as follows:

| comonomer | feed rate (kilograms per hour) |
| --- | --- |
| ethylene | 50 |
| vinyl acetate | 8 |
| N-phenylmaleimide | 2 |

The cumene hydroperoxide is fed at a rate of 1 gram per hour.

The resulting copolymer has a melt index of 2.5 grams per 10 minutes and contains 3 percent by weight N-phenylmaleimide and 12 percent by weight vinyl acetate based on the weight of the copolymer.

The copolymer is pelletized and the pellets are formed into a 70 micron thick tubular film using a 40 millimeter diameter screw extruder having a length to diameter ratio of 24 at an extrusion temperature of 170° C. and a blow ratio of 1.6. The film has a breaking strength of 310 kilograms per square centimeter.

EXAMPLE <

Example 20 is repeated except that the polymerization temperature is 220° C. and the pressure is 1700 kilograms per square centimeter.

The feed rates are as follows:

| Comonomer | feed rate (kilograms per hour) |
| --- | --- |
| Ethylene | 60 |
| vinyl acetate | 16 |
| N-phenylmaleimide | 4 |

The cumene hydroperoxide is fed at a rate of 1.5 grams per hour.

The resulting copolymer has a melt index of 3 grams per 10 minute and contains 6 percent by weight N-phenylmaleimide and 17 percent by weight vinyl acetate.

The copolymer is pelletized and the pellets are formed into a tube having an outside diameter of 20 millimeters and a wall thickness of 2 millimeters using a 20 millimeter diameter extruder having a length to diameter ratio of 24 at an extrusion temperature of 190° C. The tube has a breaking strength of 280 kilograms per square centimeter.

EXAMPLE 22

Example 21 is repeated except that the polymerization pressure is 2000 kilograms per square centimeter.

The feed rates are as follows:

| Comonomer | feed rate (kilograms per hour) |
| --- | --- |
| Ethylene | 70 |
| Vinyl acetate | 30 |
| N-phenylmaleimide | 15 |

The cumene hydroperoxide is fed at a rate of 2 grams per hour.

The resulting copolymer has a melt index of 5 grams per 10 minutes and contains 16 percent by weight N-phenylmaleimide and 24 percent by weight vinyl acetate.

The copolymer is pelletized and the pellets are formed into a blow molded container (1.6 liters in volume at 50 grams by weight) using a 55 millimeter diameter extrusion blow molding machine a length to diameter ratio of 23.5 at a molding temperature of 170° C. The container has good impact resistance, ESC resistance, and heat resistance.

The evaluation is conducted as in example 17. It is noted that the container breaks when dropped from a height of 12 meters.

EXAMPLE 23

Example 22 is repeated except that the polymerization pressure is 1500 kilograms per square centimeter.

The feed rates are as follows:

| Comonomer | feed rate (kilograms per hour) |
| --- | --- |
| Ethylene | 40 |
| vinyl acetate | 30 |
| N-phenylmaleimide | 30 |

The polymerization initiator is azobisbutyronitrile fed at a rate of 3 grams per hour.

The resulting copolymer has a melt index of 7 grams per minute and contains 27 percent by weight N-phenylmaleimide and 28 percent by weight vinyl acetate. The composition is formed into a transport container a in Example 18 with similar results.

EXAMPLE 24

Example 20 is repeated except that the pellets are used for wire coating as in Example 19 with similar results.

In the above examples, tensile strength is determined under ASTM D638; elongation under ASTM D638; VICAT softening point under ASTM D1525; and melt index under ASTM D1238.

What is claimed is:

1. A composition comprising (i) a copolymer of (a) ethylene; (b) one or more polar unsaturated compounds selected from the group consisting of alcohols each having one OH group; acids, each having one COOH group; and esters, each of which, is the reaction product of an alcohol having one OH group and an acid having one COOH group; and (c) an N-substituted maleimide or (ii) a copolymer of (a) ethylene and (b) one or more polar unsaturated compounds as defined above grafted with (c) an N-substituted maleimide wherein the comonomers (a), (b) and (c) are present in the copolymer in about the following proportions based on the weight of the copolymer:

| | Comonomer | Percent by weight |
| --- | --- | --- |
| (a) | ethylene | 70 to 94 |
| (b) | polar unsaturated compound | 5 to 30 |
| (c) | N-substituted maleimide | 0.01 to 10 |

2. The composition defined in claim 1 comprising a copolymer of (a) ethylene; (b) one or more polar unsaturated compounds selected from the group consisting of alcohols, each having one OH group; acids, each having one COOH group; and esters, each of which is the reaction product of an alcohol having one OH group and an acid having one COOH group; and (c) an N-substituted maleimide.

3. The composition defined in claim 1 wherein the polar compound is a vinyl ester or an unsaturated carboxylic acid ester.

4. The composition defined in claim 1 wherein the polar compound has 2 to 20 carbon atoms.

5. The composition defined in claim 1 wherein one or two polar compounds are included in the copolymer.

6. The composition defined in claim 1 wherein the N-substituent is an unsubstituted or substituted aromatic or saturated aliphatic or cycloaliphatic radical.

7. The composition defined in claim 6 wherein the radical is an alkyl, cycloalkyl, alkaryl, or aralkyl radical.

8. The composition defined in claim 6 wherein the radical has 3 to 18 carbon atoms.

9. The composition defined in claim 6 wherein the radical is substituted with halogen, hydroxy, or alkoxy radicals.

* * * * *